(Model.) 2 Sheets—Sheet 1.
G. POTTER.
ANIMAL TRAP.
No. 461,710. Patented Oct. 20, 1891.
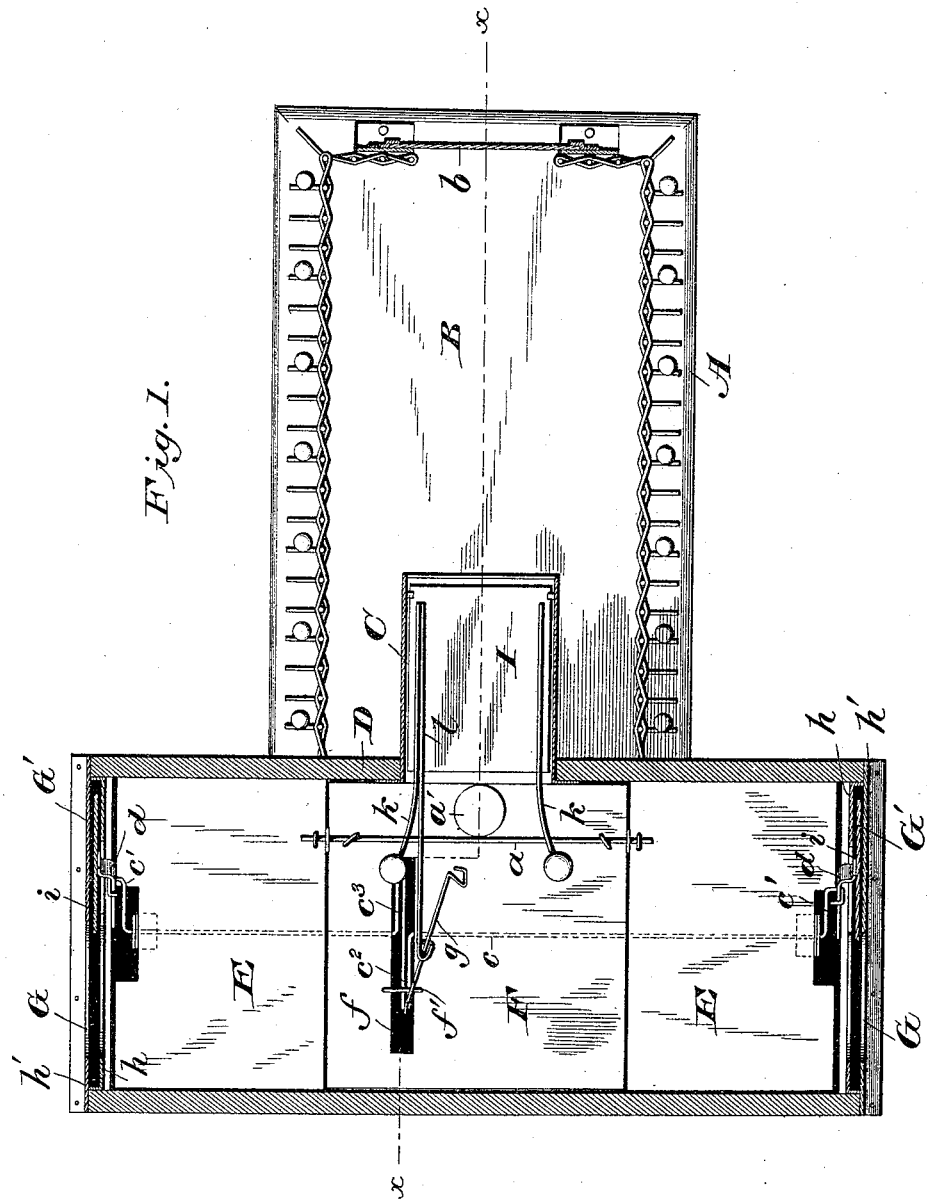
Fig. 1.
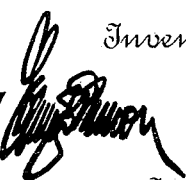
Witnesses
G. S. Elliott
C. M. Johnson
Gideon Potter,
Inventor
by
Attorney (Model.) 2 Sheets—Sheet 2.
G. POTTER.
ANIMAL TRAP.
No. 461,710. Patented Oct. 20, 1891.
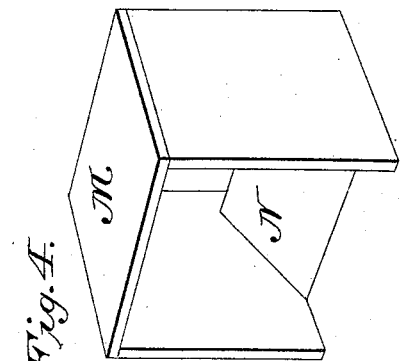
Fig. 4.
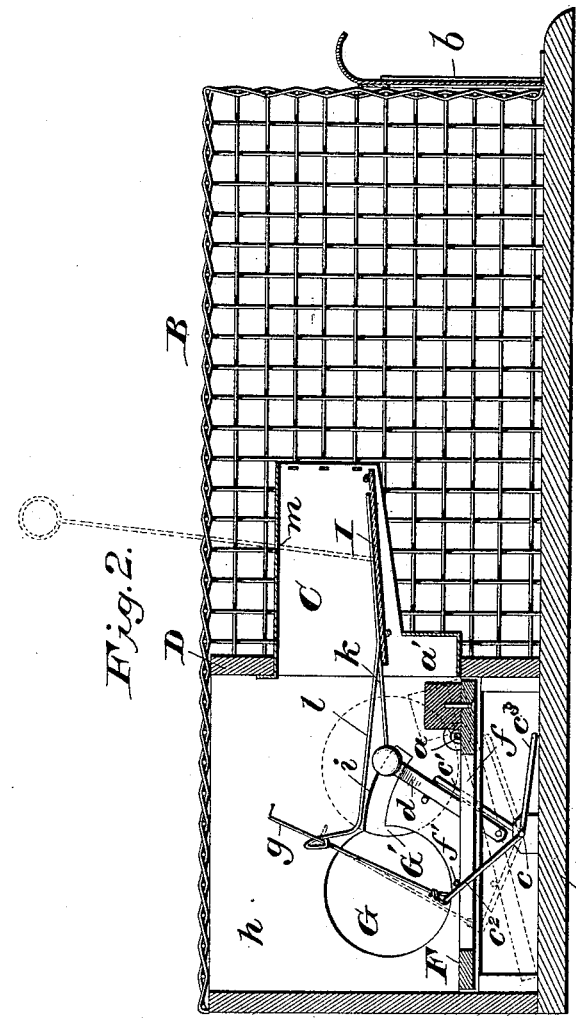
Fig. 2.
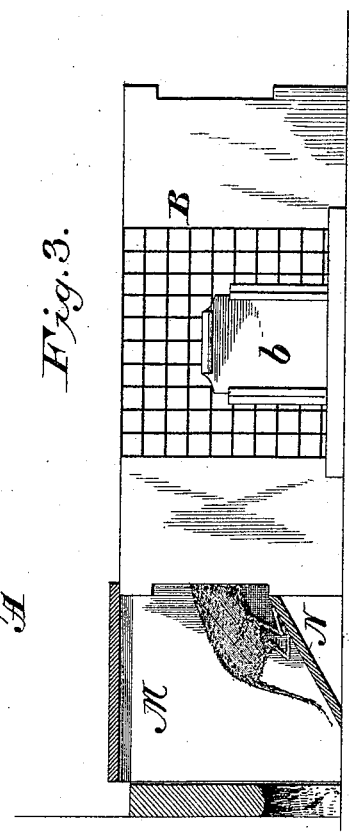
Fig. 3.
Witnesses
L. D. Elliott
E. W. Johnson
Gideon Potter
Inventor
by
Attorney

UNITED STATES PATENT OFFICE.

GIDEON POTTER, OF OSCEOLA, ILLINOIS.

ANIMAL-TRAP.

SPECIFICATION forming part of Letters Patent No. 461,710, dated October 20, 1891.

Application filed April 2, 1891. Serial No. 387,422. (Model.)

*To all whom it may concern:*

Be it known that I, GIDEON POTTER, a citizen of the United States of America, residing at Osceola, in the county of Stark and State of Illinois, have invented certain new and useful Improvements in Animal-Traps; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in self-setting animal-traps; and it consists in the special construction and combination of the parts, as will be hereinafter fully set forth, and particularly pointed out in the claims.

The object of the invention is to provide a self-setting animal-trap having a compartment into which the animal may pass and in so doing will reset the trap, said trap being adapted to be used either with or without bait.

In the accompanying drawings, forming part of this specification, Figure 1 is a horizontal sectional view. Fig. 2 is a sectional view on the line $x\ x$ of Fig. 1. Fig. 3 is an end view showing the application of the trap attachment, and Fig. 4 is a perspective view of the attachment.

This invention is more especially designed as an improvement upon that class of animal-traps shown in the patents to S. F. Estell, dated November 20, 1866, and B. C. Smith, dated July 11, 1871.

A refers to the base or floor-board of the trap, which carries at one end a compartment B, having at one end a sliding door $b$ and at the other a chute or way C, which is secured to the partition-board D and maintained horizontally thereby. The main portion of the trap is provided with a supplemental floor E, located a suitable distance above the floor A, and centrally with a platform F, having a slot $f$, through which passes one member of the rock-lever. This platform F is hinged to the floor E by a bar $a$, located near one end of the same, and beyond said bar it is provided with a weight $a'$, which serves as a counter-balance for the extended portion thereof.

$c$ refers to a rock-lever, which is pivoted in suitable bearings attached to the base A, the terminal portions $c'$ of this rock-shaft being bent at the same angle to engage with the pivoted bars $d$, to which the doors which move over the apertures G are attached. The rock-shaft $c$ is provided with two members $e^2$ and $e^3$, which are bent at an obtuse angle with each other. The member $c^3$, when the trap is set, abuts against the base A and limits the movement of the shaft $c$ to prevent an excessive inclination of the doors G'. The opposite member $c^2$, when the platform F is horizontal, bears against a loop $f'$, which intersects the slot, while to the outer end of said member $c^2$ is secured a rod $g$, having a bent end, which engages with the pivoted trap-door leading into the compartment B. The floors E are cut away at their ends to permit movement of the members $c'$ of the shaft $c$, as well as the pivoted bars $d$, which are pivoted beneath said floors to strips attached to the base A. The ends of the trap are provided with walls $h$ and $h'$, which are secured to the base and side pieces, and are correspondingly cut away to present the apertures G, and the inner walls are provided with curved slots $i$, through which the ends of the pivoted bars $d$, which carry the doors G', pass, said bars being pivoted, as shown, Fig. 2. The bent ends $c'$ of the shaft $c$ engage with the bars $d$, so as to close the swinging doors G' when the platform is depressed and return the doors to their first position when the platform is returned to its normal or horizontal position. By this construction it will be obvious that both the doors G' move in unison, and when the platform F is tilted by the weight of the animal passing thereon the doors will be closed. As soon as the animal finds himself captured he will pass into the chute C upon the hinged platform I, which is held normally closed by means of the weighted arms $k$. This platform I, in addition to the weighted arms, carries a bar $l$, the end of which is bent to encircle the bar $g$. When the weight of the animal depresses the platform I in the chute, he will pass into the compartment B and at the same time rock the shaft $c$ to open the doors, and thus reset the trap. The chute C is provided at one end with bars and with a transverse strip for limiting the upward movement of the platform I. The upper wall of the chute is apertured at $m$, through which a wire can be passed for setting the trap should the doors become closed. The top of the trap and sides and end of the compartment B are covered with wire.

M refers to an attachment adapted to be used in connection with my improved trap, the same consisting of a frame having side and top pieces and an inclined floor-board N, the height of the rear edge of which is about the same as the apertures leading into the trap, and by placing the same in front of a rat-hole the rat in leaving the hole will be guided into the trap. When such a device is used, it is unnecessary to bait the trap.

Having thus described my invention, what I claim as new, and desire to secure by Letters Patent, is—

1. In an animal-trap constructed substantially as shown, the combination of the shaft $c$, having bent ends connected to pivoted bars which carry the doors, said shaft having bent members $c^2$ and $c^3$, a pivoted platform F, having a slot and pin $f$, which engages with the member $c^2$ of the shaft, a rod $g$, attached to said member, and a bar $l$, carried by a pivoted platform I, located within a chute C, substantially as shown, and for the purpose set forth.

2. The combination, in an animal-trap having two compartments connected to each other by a chute having a pivoted platform I, of weighted bars $k$, attached to said platform to hold the same elevated, and a bar $l$, carried by the platform, which is in sliding engagement with the rod $g$, carried by a rock-lever attached to the central shaft, so that the doors will be opened when the platform I is depressed, substantially as shown, and for the purpose set forth.

3. The combination, in an animal-trap, of a base A, above which are located supplemental floors E E and a platform F, a weight $a'$ for counterbalancing said platform, double walls $h$ and $h'$, having apertures, doors G, located between said double walls and provided with pivoted supports $d$, with which the bent ends of a rock-shaft engage, said rock-shaft having beneath the slot in the pivoted platform crank-arms at obtuse angles with each other, a rod $g$, secured to one of said crank-arms, and a bar $l$, attached to a pivoted platform and bent to encircle and be in sliding engagement with the arm $g$, said platform being pivoted within a chute, the top of the chute having an aperture $m$, substantially as shown, and for the purpose set forth.

In testimony whereof I affix my signature in presence of two witnesses.

GIDEON POTTER.

Witnesses:
WALTER L. WHAPLES,
WILL STUART.